United States Patent [19]

Schroeder

[11] 4,288,843

[45] Sep. 8, 1981

[54] CAPACITOR CONSTRUCTION WITH SELF-LOCKING CLOSURE

[75] Inventor: Walter W. Schroeder, Williamstown, Mass.

[73] Assignee: Sprague Electric Company, North Adams, Mass.

[21] Appl. No.: 71,209

[22] Filed: Aug. 30, 1979

[51] Int. Cl.$^3$ .................. H01G 9/00; H02G 13/08; H05K 5/00

[52] U.S. Cl. .................. 361/433; 174/52 R; 429/163; 429/164; 429/176

[58] Field of Search .................. 361/433; 174/52; 429/163, 164, 176

[56] References Cited

U.S. PATENT DOCUMENTS

| | | |
|---|---|---|
| 1,726,543 | 9/1929 | Curtis et al. |
| 1,796,855 | 3/1931 | Ahlers . |
| 2,579,462 | 12/1951 | Barnard et al. |
| 2,582,973 | 1/1952 | Ellis .................. 429/164 |
| 2,636,062 | 4/1953 | Colton .................. 361/433 |
| 2,743,400 | 4/1956 | Bujan .................. 361/433 |
| 2,816,153 | 12/1957 | Kort .................. 429/163 |
| 3,456,171 | 7/1969 | Adelson et al. |
| 3,487,270 | 12/1969 | Alwitt .................. 361/433 |
| 3,680,203 | 8/1972 | Braiman et al. .................. 361/433 |
| 4,170,694 | 10/1979 | Chase et al. .................. 429/176 |

FOREIGN PATENT DOCUMENTS 250196 8/1926 United Kingdom .
778853 7/1957 United Kingdom .

Primary Examiner—Andrew J. James
Attorney, Agent, or Firm—Connolly and Hutz

[57] ABSTRACT

A capacitor has a housing of two open-mouth metal cans joined in a non-overlapping arrangement by an insulative bushing that is tapered to provide a self-locking closure when mated with the cans. The electrodes of the capacitance section are electrically connected internally to opposite ends of the housing. If desired, leads are attached externally opposite the internal connections.

10 Claims, 3 Drawing Figures

CAPACITOR CONSTRUCTION WITH SELF-LOCKING CLOSURE

BACKGROUND OF THE INVENTION

This invention relates to a capacitor construction having two axially opposed open-mouth cans as housing joined at the open ends in a non-overlapping arrangement via a tapered, insulative, self-locking bushing.

Cylindrical housings for capacitors open at one end that is later closed by covers, bungs, and the like are well-known in the capacitor industry. Likewise well-known are two piece housings where the open ends telescope one over the other. This latter prior art construction has had electrolyte leakage problems. One design requires two-parts of the same length as the capacitance unit so that the open end of one part telescopes against the closed end of the other, providing in effect two housings. This design requires the use of more housing material than is desirable, and it is difficult to seal the overlapped portions to each other. The former prior art design does not suffer from this drawback, although it also is difficult to seal when small units are involved. Because of small can sizes, the internal welding of the terminal tabs and the sealing of the open end requires extra care. Additionally, the closure bung takes up a relatively large proportion of the can space compared with the amount for the capacitor section, such that the resulting volumeric efficiency of the capacitor is low.

A housing that is more volumetrically efficient is composed of a two-piece thermoplastic housing fused together or provided with a tongue-and-groove mating that is then ultrasonically welded. However, these designs require thick walled containers so that some of the volumetric efficiency is lost.

The principle of self-locking tapers is wellknown in the machinery art and is described in various machinery handbooks, e.g. *Machinery's Handbook*, 17th ed, E. Oberg & F. D. Jones, Industrial Press, N.Y.C. 1964, pg. 1467. For example, twist drills and shank-type milling cutters have self-holding or self-locking taper shanks where the degree of taper is so small that the frictional forces between the shank and the socket is sufficient to drive the tool. The upper limit for a taper to be self-locking or self-holding is generally held to be 16°.

SUMMARY OF THE INVENTION

It is an object of this invention to provide a housing construction, particularly for small capacitors that is easy to seal, easy to make connections to, and that does not require excess material.

It is another object of this invention to provide a capacitor housing, particularly for small units, to which internal connections can be made readily.

It is another feature of the invention that the unit can be assembled easily, does not require the use of excess housing material, and has good volumetric efficiency.

These features are realized in accordance with this invention through the use of a two-piece housing, each piece of which is an open-mouthed can and preferably a cylinder closed at one end. A circumferential insulative bushing, with small angle tapers extending laterally from a central raised portion of at least the same outside diameter as the cans, is slipped onto the capacitance section. Electrical attachments are made from the capacitance section to the inside of each can of the housing. The housing pieces are joined by pushing them together over the tapered portions of the bushing until they are abutting the central portion so that they are locked in place and do not overlap or touch each other.

DESCRIPTION OF THE PREFERRED EMBODIMENTS

Figure 1:
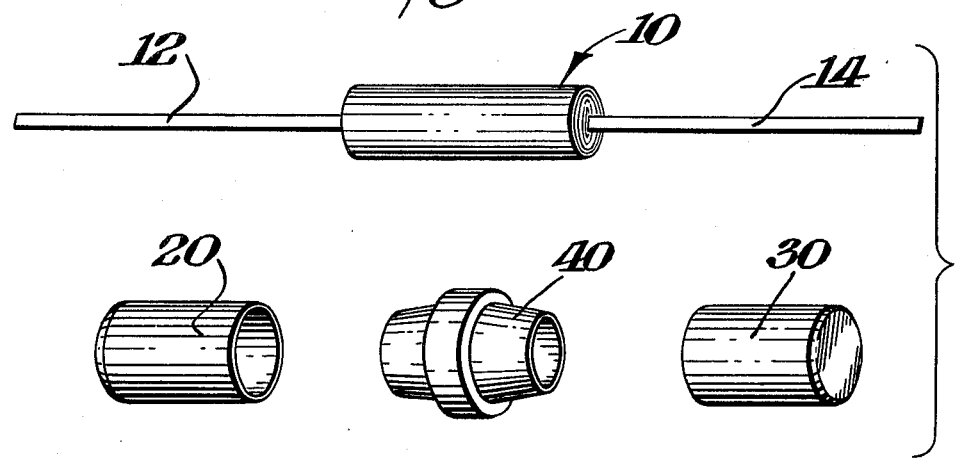
FIG. 1 shows the various parts used in the capacitor of the present invention.

FIG. 1 shows a capacitor section 10, with termination tabs 12 and 14, housing cans 20 and 30, and insulative tapered bushing 40.

Figure 2:
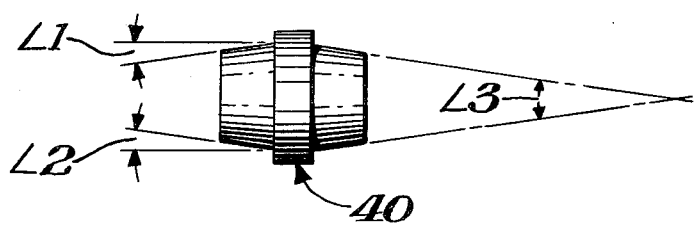
FIG. 2 shows the bushing with broken lines to show the measure of the taper angle.

Referring to FIG. 2, the taper angle can be measured from the horizontal portion of bushing 40 and is the sum of angles 1 and 2. Alternately, the angle is the included angle, angle 3, formed by extension of the tapered portion until it meets in a point.

Figure 3:
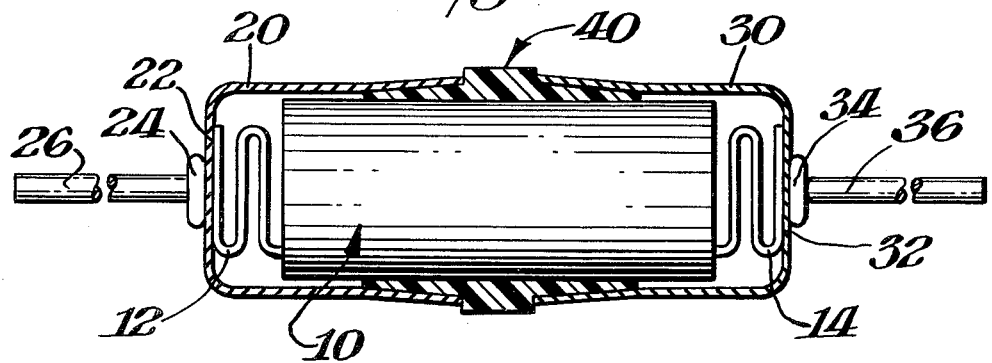
FIG. 3 is a cross-sectional view of the capacitor construction of the present invention.

Referring to FIG. 3, capacitance section 10 is located in the two-piece housing 20 and 30 to which external leads 26 and 36 are attached at 24 and 34 to the outside of the housing opposite the attachments at 22 and 32 of electrode tabs 12 and 14, respectively. The housing pieces 20 and 30 are joined by a selflocking tapered bushing 40 that seals the capacitor unit and electrically insulates the electrodes from each other. The drawing is not to scale but exaggerated to show the tabs and the bushing.

Capacitance section 10 with tab-type terminals 12 and 14 bears a tapered gasket 40 around its mid-section. The gasket 40 is tapered on both edges, and these tapers are less than 16°, preferably 8°, so that both tapers form self-locking seals with the housing pieces 20 and 30.

Housing pieces 20 and 30 are open-mouth cans and preferably cylinders with one end closed. Tablike terminals 12 and 14 are electrically connected, and preferably welded, to the inside of each cylinder 20 and 30, respectively, at 22 and 32 and external leads 26 and 36 are attached, again preferably welded, to the respective outer surface at 24 and 34. The two housing pieces 20 and 30 are then pushed into engagement with the respective tapers of bushing 40, thereby closing and sealing the capacitor and, at the same time, folding the internal electrode tabs 12 and 14 against the ends of the housing. Since the tapers of bushing 40 are less than 16°, the gasket is self-locking, and the unit must be pried apart to be opened.

The bushing material may be any insulative material inert to capacitor components, such as electrolytes. Preferably, the bushing material is an insulating polymeric material such as nylon, a polyolefin, or polyphenylene sulfide. Perfluoroethylene polymers could be used but generally parts made of them must be machined. Elastomeric materials generally do not have the desired rigidity. The housing may be of any rigid material inert to electrolyte and is preferably a metal. For electrolytic capacitors, the metal must be one of the film-forming or valve-metals, notably aluminum or tantalum.

The capacitor section 10 is preferably a rolled foil electrolytic section of two foil electrodes with a dielectric oxide therebetween and having a tab termination joined to each electrode, e.g. as shown by Schroeder et al in U.S. Pat. No. 3,174,085. Preferably the section is impregnated with electrolyte before assembly. The bushing 40 may be placed around the section 10 before it is impregnated with electrolyte. However, the bushing 40 may be placed over the rolled section 10 after impregnation. When the bushing 40 is located over the middle of the section, the housing pieces 20 and 30 are of the same length. Alternately, bushing 40 may be located closer to one end, the housing pieces then being of unequal lengths, and the off-center strip serves to indicate polarity, e.g., the shorter end is the anode.

The above construction is particularly advantageous with small or miniature units as elongated tabs can be welded internally at the same time as the external leads are welded. The capacitance unit can be placed in the respective can parts that are then pushed together to lock and seal the housing. At the same time, the tabs become folded, taking up little space, and the resulting construction has high volumetric efficiency.

The capacitor section need not be an electrolytic one; it may be an electrostatic one of tab-wound type such as shown by Schils et al in U.S. Pat. No. 3,150,301. Alternately, the section may be of an extended-foil type as shown by Schils et al in U.S. Pat. No. 3,150,300. In the latter case, the extended foils serve as electrode terminations in place of tabs 12 and 14, and connection to the housings may be made by known means, e.g., solder, conductive adhesive, ultrasonic welding, etc.

When sealing redundancy is required, an adhesive may be used with tapered bushing 40, or an outer polymeric heat-shrink sleeve may be used, with or without an adhesive, or the central portion of insulative bushing 40 may be enlarged so that it can be heated, after assembly of the unit, to reflow over the edges of the cans forming an external seal.

External leads 26 and 36 may be omitted giving a fuse-type capacitor or one that can be connected directly via the housing pieces that are insulated from each other and can serve as terminals themselves. Alternately, the external leads 26 and 36 may be attached in a radial configuration.

What is claimed is:

1. A sealed capacitor comprising a wound capacitor section, two open-mouth metal cans, and an insulative bushing with self-locking tapers, the open ends of said cans engaging to said bushing in a non-overlapping self-sealing arrangement, one electrode of said capacitor section being electrically connected to one of said cans, the other electrode being connected to the other of said cans.

2. A sealed capacitor according to claim 1 wherein said tapered bushing circumscribes said section, has a central portion of at least the same outside diameter as said cans, and said self-locking tapers being laterally tapered portions extending from said central portion, the taper of said portions being less than 16°, said cans engaging said tapers and abutting said central portion to form a self-locking seal for the capacitor.

3. A sealed capacitor according to claim 2 wherein said taper is 8°.

4. A sealed capacitor according to claim 1 wherein said capacitor section has elongated tab terminations, one of said tabs being connected to one of said cans and the other of said tabs being connected to the other of said cans.

5. A sealed capacitor according to claim 4 wherein an external lead is electrically connected to the outside of said can opposite the internal connection of said elongated tab.

6. A sealed capacitor according to claim 5 wherein said internal and external connections are welded connections.

7. A sealed capacitor according to claim 1 wherein said capacitor section is an impregnated electrolytic section.

8. A sealed capacitor according to claim 1 wherein said capacitor section is an electrostatic, tab-wound or extended-foil section.

9. A sealed capacitor according to claim 1 wherein said cans are aluminum and are cylinders open at one end.

10. A sealed capacitor according to claim 1 wherein sealing redundancy is provided by one or more of an adhesive on the tapered portion of said bushing, an exterior heat-shrunk sleeve, or by bushing material reflowed over the mouth edge of said cans.

* * * * *